United States Patent [19]

Hart

[11] Patent Number: 5,564,794
[45] Date of Patent: Oct. 15, 1996

[54] TRAIN BRAKE PIPE PRESSURE EXHAUST CONTROL SYSTEM AND REGULATING VALVE THEREFOR

[75] Inventor: James E. Hart, Trafford, Pa.

[73] Assignee: Westinghouse Air Brake Company, Wilmerding, Pa.

[21] Appl. No.: 562,961

[22] Filed: Nov. 27, 1995

[51] Int. Cl.⁶ .................................................. B60T 11/26
[52] U.S. Cl. .................... 303/3; 303/20; 303/15; 303/86; 303/40
[58] Field of Search .................... 303/3, 15, 20, 303/16–18, 33–38, 86, 40, 8, 47, 68–69; 246/167 R, 187 R

[56] References Cited

U.S. PATENT DOCUMENTS

| | | | |
|---|---|---|---|
| 4,013,323 | 3/1977 | Burkett | 303/20 |
| 4,056,286 | 11/1977 | Burkett | 303/20 |
| 5,180,213 | 1/1993 | Kingsbury | 303/86 |
| 5,383,717 | 1/1995 | Fernandez et al. | 303/20 |

*Primary Examiner*—Douglas C. Butler
*Attorney, Agent, or Firm*—G. J. Falce

[57] ABSTRACT

A brake pipe pressure control system for a railroad train including a regulating valve device under control of a microprocessor wherein the regulating valve device is housed in the existing end-of-train device and effects service and emergency reductions of brake pipe pressure from the rear end of the train in correspondence with service and emergency reductions initiated at the locomotive.

29 Claims, 5 Drawing Sheets

TRAIN BRAKE PIPE PRESSURE EXHAUST CONTROL SYSTEM AND REGULATING VALVE THEREFOR

BACKGROUND OF THE INVENTION

The present invention relates to a pneumatic brake pipe pressure regulating valve device and more particularly to such a valve device that exhausts the pressure in the brake pipe of a railroad train at a location remote from the train locomotive consistent with a brake valve regulated service reduction of brake pipe pressure at the train locomotive.

There is currently an ongoing effort underway to develop electro-pneumatic brakes for railroad freight trains. It is generally acknowledged that such electro-pneumatic brake control can enhance train operation by achieving faster brake response, more equalized car retardation, and uniform braking effort throughout a long train of cars. This implies that all of the cars or at least a majority of the cars in a train be appropriately equipped for electro-pneumatic braking, in which case direct brake cylinder pressure control is envisioned. With the exception of certain unit trains, however, it cannot be reasonably expected that any such majority of cars would be immediately implemented with the required electro-pneumatic equipment. Accordingly, indirect brake cylinder pressure control is contemplated, in which the train brake pipe pressure is controlled at one or several remote cars throughout the train to accelerate reductions of brake pipe pressure in order to obtain faster brake response.

Presently, railroad trains are required to carry an end-of-train unit on the last car, which, among other functions, may be equipped to independently and remotely initiate an emergency reduction of brake pipe pressure from the rear of the train in response to the operator activation of a special triggering device in the locomotive. This is accomplished by transmitting an emergency brake application command signal from the locomotive to the end-of-train unit via radio communication.

SUMMARY OF THE INVENTION

It is an object of the present invention to incorporate in the end-of-train unit an electrically controlled pneumatic regulating valve device for exhausting the train brake pipe pressure at the last car in accordance with service, as well as emergency, brake application signals transmitted from the locomotive.

It is an extension of the foregoing objective to establish the different service and emergency rates of brake pipe pressure reduction at the end-of-train unit employing only a single brake pipe exhaust valve.

Another object of the invention is to employ microprocessor controlled solenoid valves to operate the pneumatic regulating valve in a manner which avoids excessive valve cycling.

It is still another object of the invention to provide fail safe operation of the electrically controlled regulating valve device in the event of an electrical malfunction.

It is a final object of the invention to provide a brake pipe pressure regulating valve, as in the foregoing, that is suitably sized for installation in end-of-train units.

Briefly, these objectives are carried out through a regulating valve device that is connected to the train brake pipe at the end-of-train unit and operates to exhaust the brake pipe pressure at either a service or an emergency rate in accordance with a radio transmitted command signal from the locomotive. Until the commanded brake pipe pressure is reached, a pressure differential exists across the regulating valve control piston, which operates an exhaust valve to reduce the brake pipe pressure to a value corresponding to the command signal. The pressure differential during a service application is only sufficient to displace the exhaust valve a limited distance in which a metering action through a variable flow orifice occurs to regulate the exhaust of brake pipe pressure so as to not produce an emergency rate. During an emergency application, the higher control piston pressure differential displaces the exhaust valve a distance sufficient to suddenly fully open the exhaust valve and thereby provide an emergency rate of reduction of brake pipe pressure.

BRIEF DESCRIPTION OF THE DRAWINGS

These and other objects and advantages of the invention will become apparent from the following more detailed description when taken in conjunction with the accompanying drawings in which.

DESCRIPTION AND OPERATION

Figure 1:
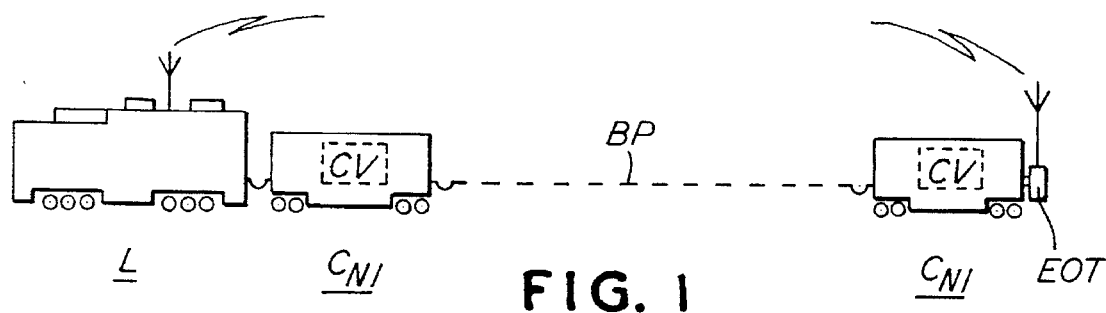
FIG. 1 is a schematic view showing a railroad train comprising a plurality of freight cars headed by a locomotive having radio communication with an end-of-train unit on the last car of the train.

As shown in FIG. 1, a train of railroad cars $C_N$ are physically coupled to a locomotive L by typical railroad car couplers (not shown) and are further coupled pneumatically by a brake pipe BP that extends continuously from the locomotive to the last car $C_{NL}$. Associated with the last car is an end-of-train unit DOT that is coupled to the locomotive via radio communication. The last car $C_{NL}$ of the train is further provided with a brake control valve device CV, as are the other cars $C_N$. Control valve devices CV are preferably an A.A.R. standard AB type control valve, such as an ABD, ABDW or ABDX valve manufactured by the Westinghouse Air Brake Co. As is well known, these car control valve devices CV operate to control the car brakes in response to variation of the train brake pipe pressure at the respective cars.

Figure 2:
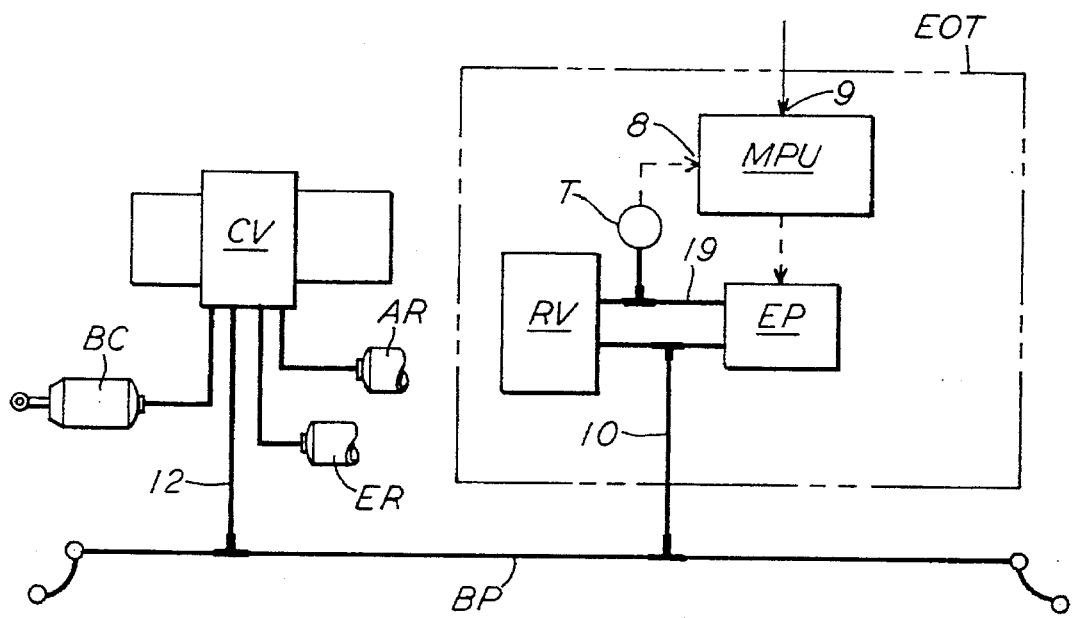
FIG. 2 is a block diagram of a microprocessor based indirect brake cylinder pressure control system adapted for end-of-train service.

Referring now to FIG. 2, end-of-train unit DOT includes a microprocessor unit MPU, a brake pipe pressure regulating valve device RV, and an electro-pneumatic interface unit EP to which brake pipe BP is connected by a branch pipe 10, and via which microprocessor unit MPU operates regulating valve device RV to control the exhaust of brake pipe pressure in accordance with a radio transmitted command signal at input 9 and a transducer T feedback signal at input 8.

Each car $C_N$, including the last car $C_{NL}$, has its control valve CV connected to brake pipe BP via another branch pipe 12. Control valve CN on each car is associated with an auxiliary reservoir AR and an emergency reservoir ER that are charged via brake pipe BP and provide a source of compressed air for operating the car brake cylinder device BC in response to service and emergency rates of reduction in the brake pipe pressure. Such operation is well-known to those skilled in the art, and thus requires no further explanation.

Figure 4:
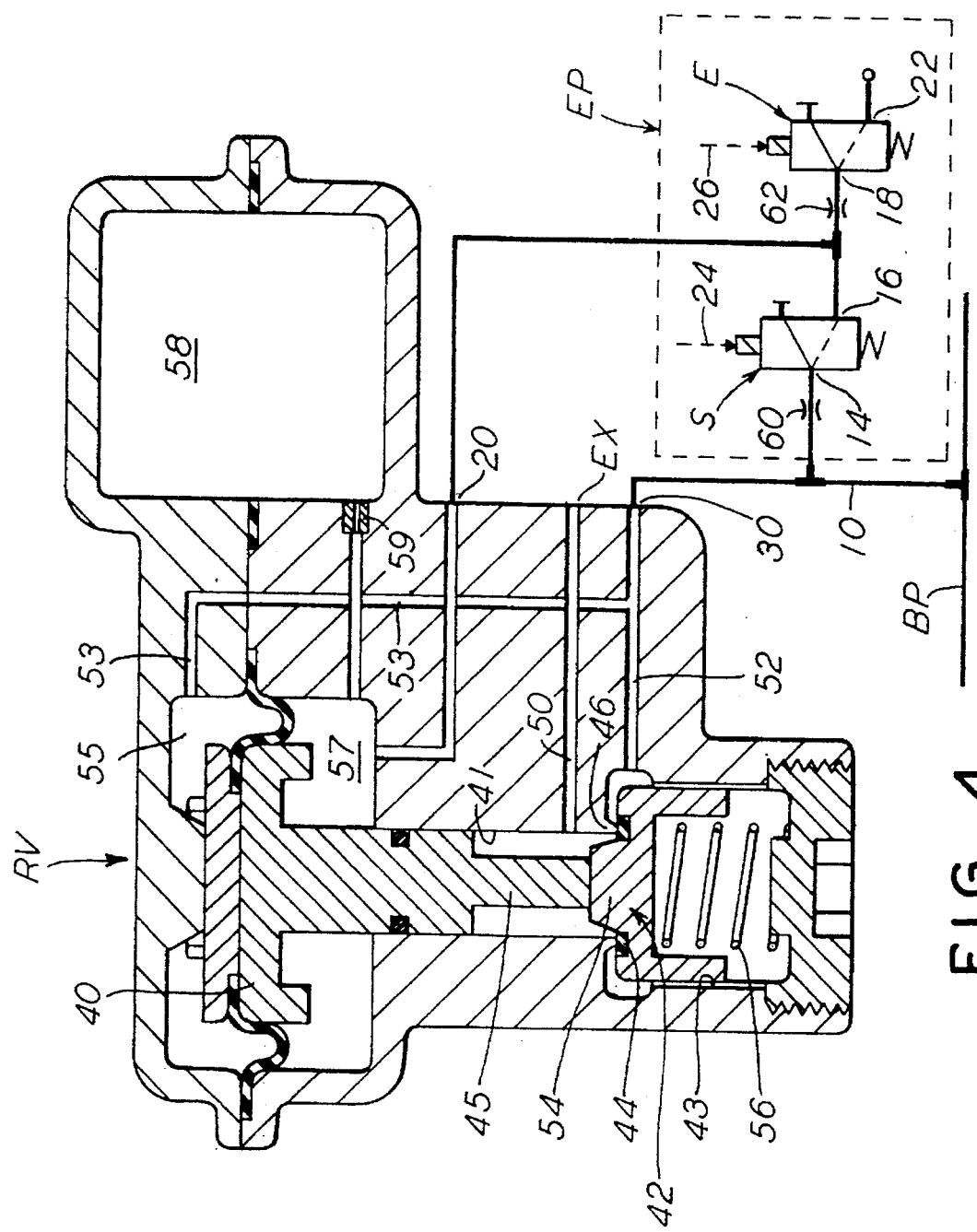
FIG. 4 is a diagrammatic view showing a first embodiment of an electrically operated pneumatic regulating valve for carrying out the service and emergency reduction of brake pipe pressure in accordance with the indirect brake cylinder pressure control system of FIG. 2.

In a first embodiment of the invention shown in FIG. 4, electro-pneumatic interface unit EP comprises a normally-open, solenoid-operated, spring-returned, supply valve S having an inlet 14 connected to branch pipe 10 and an outlet 16; and a normally-closed, solenoid-operated, spring-returned, exhaust valve E having an inlet 18 to which outlet 16 of supply valve S is connected via piping network 19 and an outlet 22 that is vented to atmosphere. The other outlet of each solenoid valve E and S is blanked. The respective solenoid valves E and S are further connected to microprocessor unit MPU via wires 24 and 26.

In accordance with this first embodiment of the invention, a control port 20 of regulating valve device RV is connected to piping network 19, a supply port 30 is connected to branch pipe 10, and an exhaust port EX is vented to atmosphere. Regulating valve device RV further comprises a diaphragm operated piston member 40 that is operatively disposed in a guide bore 41, and a service/emergency exhaust valve 42 that is disposed in a fluted counterbore 43 of bore 41.

An annular disc valve element 44 is carried by exhaust valve 42 adjacent an annular valve seat 46 that is formed at the terminus of guide bore 41. A portion of piston member 40 within guide bore 41 is undercut to form an actuating stem 45 that is engageable with exhaust valve 42 when piston member 40 is actuated in order to unseat valve element 44. Extending from bore 41 to an exhaust port EX is an exhaust passage 50. Another passage 52 extends from supply port 30 to counterbore 43. Communication between these passages 50, 52 is controlled by exhaust valve 42.

A protrusion 54 of exhaust valve 42 projects into bore 41 with a predetermined minimum clearance therebetween. Preferably, protrusion 54 is tapered to provide a variable orifice to meter the exhaust of brake pipe pressure as will hereinafter be explained. A control spring 56 biases exhaust valve 42 in a direction to seat valve element 44 and thereby interrupt communication between passage 52, and exhaust passage 50. Passage 52 is connected by a branch passage 53 to a chamber 55 formed on the upper side of piston member 40 and by fluted counterbore 43 to the underside of exhaust valve 42.

As brake pipe BP is charged to the train operating pressure, by movement of the locomotive brake valve handle (not shown) to release position in a manner well-known in the railroad industry, branch pipe 10 conducts pressure from brake pipe BP to supply port 30 and supply passage 52, thereby charging chamber 55 via branch passage 53 and the underside of exhaust valve 42 via fluted counterbore 43.

Concurrently with the charging of brake pipe BP, a corresponding radio signal is transmitted from the locomotive L to the end-of-train unit EOT at the last car $C_{NL}$. Microprocessor MPU operates in response to this signal to de-energize both solenoid valves E and S, as shown in the following solenoid valve schedule.

Prior to a brake release, valve S may also move to its open position after a set elapsed time following a brake application.

| FUNCTION | VALVE E | VALVE S |
| --- | --- | --- |
| release and charging | D - closed | D - open |
| service | E - open | D - open |
| stabilization | D - closed | E - closed |
| emergency | E - open | E - closed |

As shown, supply solenoid valve S when de-energized is in its normally open position in which brake pipe pressure is conducted from branch pipe 10 to the relay valve control port 20 via piping network 19. From control port 20, a chamber 57 below diaphragm piston member 40 and a relatively small (approx. 60 cu. in.) stability chamber 58 are charged. The volume of chamber 58 is an important consideration due to the space limitation of end-of-train unit EOT. A choke 59 between chamber 57 and chamber 58 assures quick pressurization of chamber 57 to maintain piston member 40 in its de-activated position. Piston member 40 is pressure balanced during such charging of the brake pipe so that control spring 56 is effective to maintain exhaust valve 42 closed.

Also, exhaust solenoid valve E when de-energized is in its normally closed position in which the pressure supplied to piping network 19 via supply solenoid valve S is cut-off from atmosphere.

At each car $C_N$ including the last car $C_{NL}$, as shown in FIG. 2, control valve device CV operates in response to the increasing brake pipe pressure to charge auxiliary reservoir AR and emergency reservoir ER to the operating pressure of brake pipe BP, while concurrently venting the car brake cylinder device BC, this function of control valve CV being commonly known as "release and charging".

When it is desired to make a service brake application following charging of brake pipe BP, the locomotive brake valve device (not shown) is set in a position to achieve a brake pipe pressure reduction corresponding to the degree of brake application desired. This reduction of brake pipe pressure constitutes a pneumatic signal that propagates through the train from front to rear via brake pipe BP.

Concurrently, a service brake command signal is transmitted via radio from the locomotive to the end-of-train unit EOT corresponding to the reduced locomotive brake pipe pressure. Microprocessor MPU operates in response to a difference between the transmitted command signal at input 9 and a feedback signal from transducer T at input 8 to energize and thus open exhaust solenoid valve E, while the normally open condition of the de-energized supply solenoid valve S remains unchanged. Appropriately sized chokes 60, 62 are provided at the respective inlets 14, 18 of solenoid supply and exhaust valve S, E, the flow capacity of these chokes 60, 62 at the prevailing pressure differentials thereacross being such that less air is supplied to piping network 19 than is exhausted. This initiates a regulating phase of operation of regulating valve device RV, in which the control pressure in stability chamber 58 and effective in control chamber 57 is reduced at a predetermined service rate until the reduced control pressure corresponds to the target pressure in accordance with the command signal transmitted to input 9 of microprocessor MPU.

At the commencement of this reduction of control pressure effective in chamber 57, the pressure in chamber 55 remains substantially constant due to the normal delay in the propagation of the brake pipe pressure reduction from the front to the rear of the train. Accordingly, a downward acting force differential is created across piston member 40 to actuate piston member 40 and thereby cause stem 45 to engage exhaust valve 42 and disengage valve element 44 from seat 46 against the force of spring 56. Exhaust valve 42 is thus opened and brake pipe pressure is exhausted at the last car $C_{NL}$ via branch pipe 10, passage 52, the open exhaust valve 44/46, bore 41, exhaust passage 50 and port EX. In this manner, a brake pipe pressure reduction is initiated at the end-of-train unit on the last car of the train, concurrently with the reduction initiated at the locomotive. The amount of deflection of piston member 40, as controlled by the pick-up rate of control spring 56 in response to the actuating pressure differential across piston member 40, determines the relationship between tapered protrusion 54 and bore 41, and thus the exhaust orifice area via which brake pipe pressure and also the pressure effective in chamber 55 exhausts. If the rate of pressure reduction in chamber 55 is different than the predetermined rate of reduction of control pressure effective in chamber 57, the actuating pressure differential across piston member 40 will change accordingly, thereby allowing spring 56 to move exhaust valve 42 slightly in the appropriate direction to increase or decrease the exhaust orifice area and thereby adjust the exhaust of brake pipe pressure by reason of the relationship between tapered protrusion 54 and bore 41. It is also noteworthy that some brake pipe air will be exhausted via supply valve S and exhaust valve E in establishing the control pressure in chamber 57, in addition to the brake pipe air exhausted via valve 42. It will be appreciated, therefore, that piston member 40 is self-regulated such that in conjunction with the brake pipe pressure exhaust via exhaust solenoid valve E, exhaust valve 42 finds a position in which the rate of brake pipe pressure reduction effective in chamber 55 corresponds to the predetermined rate of pressure reduction established in control chamber 57 by solenoid valves E and S and chokes 62 and 60. This predetermined rate of control pressure reduction represents a service rate at which the brake pipe pressure reduction via exhaust valve 42 is thus limited, so long as protrusion 54 is not displaced from bore 41. When the reducing pressure in control chamber 57 and 58 reaches the commanded target pressure, as determined by microprocessor MPU in accordance with the feedback signal received from transducer T (FIG. 2), supply solenoid valve S is energized to cut-off further supply of brake pipe pressure to piping network 19 and exhaust solenoid valve E is de-energized to cut-off further exhaust of control pressure from piping network 19.

This terminates the initial phase of relay valve operation and initiates a stabilizing phase of control. As the brake pipe pressure continues to be exhausted via open exhaust valve 42, the corresponding pressure reduction in chamber 55 gradually reduces the actuating differential across piston member 40, allowing spring 56 to return valve element 44 to its seat 46 and thereby halt the reduction of brake pipe pressure via exhaust valve 42.

Figure 3:
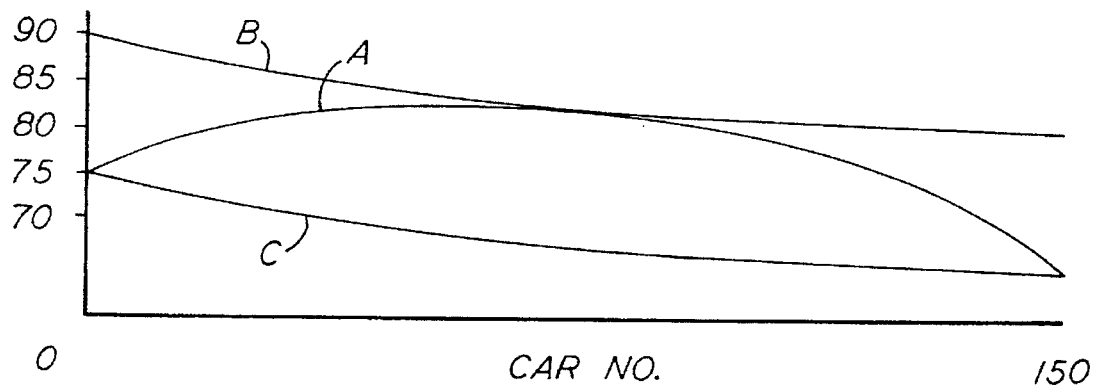
FIG. 3 is a graph showing how the brake pipe pressure at the end of the train transitions to a reduced pressure under control of the end-of-train unit in accordance with the present invention.

In that brake pipe pressure is temporarily greatest near the middle of the train, as represented by curve A in FIG. 3, during the pressure transition from the train operating pressure represented by curve B to a reduced pressure represented by curve C, it will be appreciated that the air in the brake pipe will flow from the middle towards the front and rear and gradually stabilize at the natural pressure gradient of the reduced brake pipe pressure.

During the regulating phase of regulating valve operation, premature closure of exhaust valve 42 results in this pressure equalization flow causing an increase in the brake pipe pressure towards the rear of the train. The resultant pressure rise at the rear of the train causes an increase in pressure at relay valve chamber 55, re-establishing a pressure differential with the fixed pressure in control chamber 57 to force piston member 40 in a downward direction. Accordingly, exhaust valve 42 is reopened to exhaust more brake pipe pressure via exhaust passage 50 and exhaust port EX until the reduced brake pipe pressure restores a pressure balance on piston member 40 to allow spring 56 to again close exhaust valve 42. During this stabilizing phase of relay valve operation, the brake pipe pressure may be periodically reduced by self-regulating action until the pressure gradient along the brake pipe is substantially equalized at the commanded target pressure without any further operation of either one of the supply and exhaust solenoid valves. More typically, this self-regulating action in accomplished by reason of the exhaust valve 42 gradually pinching off as the brake pipe pressure is effectively reduced in the middle of the train and less and less air flows to the last car to be exhausted. The exhaust orifice is thus adjusted to permit the exhaust to exactly match the amount of air flowing to the valve from the mid-train brake pipe, thereby keeping the pressure consistent.

It may be found necessary, however, to very briefly open the exhaust solenoid valve E during this stabilizing period in the event a transient temperature increase should cause the trapped control pressure in chamber 57 to increase inadvertently. In thus reducing the brake pipe pressure at the end-of-train unit EOT in conjunction with a brake pipe reduction at the locomotive or head end of the train during service braking, the control valve devices CV on cars toward the rear of the train respond more quickly to apply the car brakes so that more rapid and more uniform braking throughout the train is achieved.

If a further service reduction of brake pipe pressure is called for at the locomotive, microprocessor MPU is again commanded to establish a new target pressure by initiating another cycle of operation of relay valve RV via solenoid valves E and S, as explained.

When an emergency brake application is desired, microprocessor MPU receives the appropriate radio signal from the locomotive and energizes supply solenoid valve S, as well as exhaust solenoid valve E. In its energized condition, as shown in the solenoid valve operating schedule, solenoid valve S is closed to cut-off inlet 14 from outlet 16, while exhaust valve E is opened to connect its inlet 18 to outlet 22. Thus, while exhaust valve E vents piping network 19, as in the case of a service application, supply valve S is prevented from supplying any air to supplement the lost air in piping network 19, and therefore the control pressure reduction in chamber 57 occurs at a rate that exceeds the predetermined reduction rate during service, i.e., an emergency rate. This emergency reduction in control chamber 57 is encouraged by the fact that choke 59 is sized to limit the reduction of pressure in stability chamber 58 to a service rate, thus effectively limiting the volumetric capacity of control pressure to that of chamber 57. The resultant reduction of control pressure in chamber 57 thus quickly exceeds the counteracting pressure reduction in chamber 55, which as previously explained, is limited to a maximum service rate in accordance with the relationship between protrusion 54 and bore 41. Accordingly, the pressure differential created across piston member 40 is sufficient to deflect exhaust valve 42 against the force of spring 56 sufficiently to displace protrusion 54 from bore 41 and thereby allow brake pipe pressure to escape to atmosphere substantially unrestricted. This sudden rapid reduction of brake pipe pressure at the end-of-train unit EOT initiates an emergency brake application at the rear of the train in conjunction with the emergency application initiated at the locomotive or head end of the train. The car control valves CV respond to this emergency reduction of brake pipe pressure to propagate the emergency wave forward from the end-of-train unit, as during a service reduction of brake pipe pressure, in order to hasten the emergency response of the control valve devices CV on cars $C_N$ situated toward the rear of the train.

In so controlling regulating valve device RV through solenoid operated supply and exhaust valves, as explained in the foregoing, it is desirable to have the solenoid valves de-energized during the "release and charging" function, in order to minimize the consumption of battery power. Also, as explained, the supply solenoid valve must assume an open position during charging.

In the event of a power failure or malfunction of microprocessor MPU, that de-energizes supply solenoid valve S, it will thus automatically assume its open position. Should such an event occur during the stabilizing phase of a service brake application, supply valve S would be open instead of closed and thus cause the control pressure in chamber 57 to inadvertently increase and consequently cause closure of brake pipe exhaust valve 42 prematurely. The continued flow of brake pipe pressure from mid-train could then increase BP pressure at the rear and cause an undesired brake release.

Figure 5:
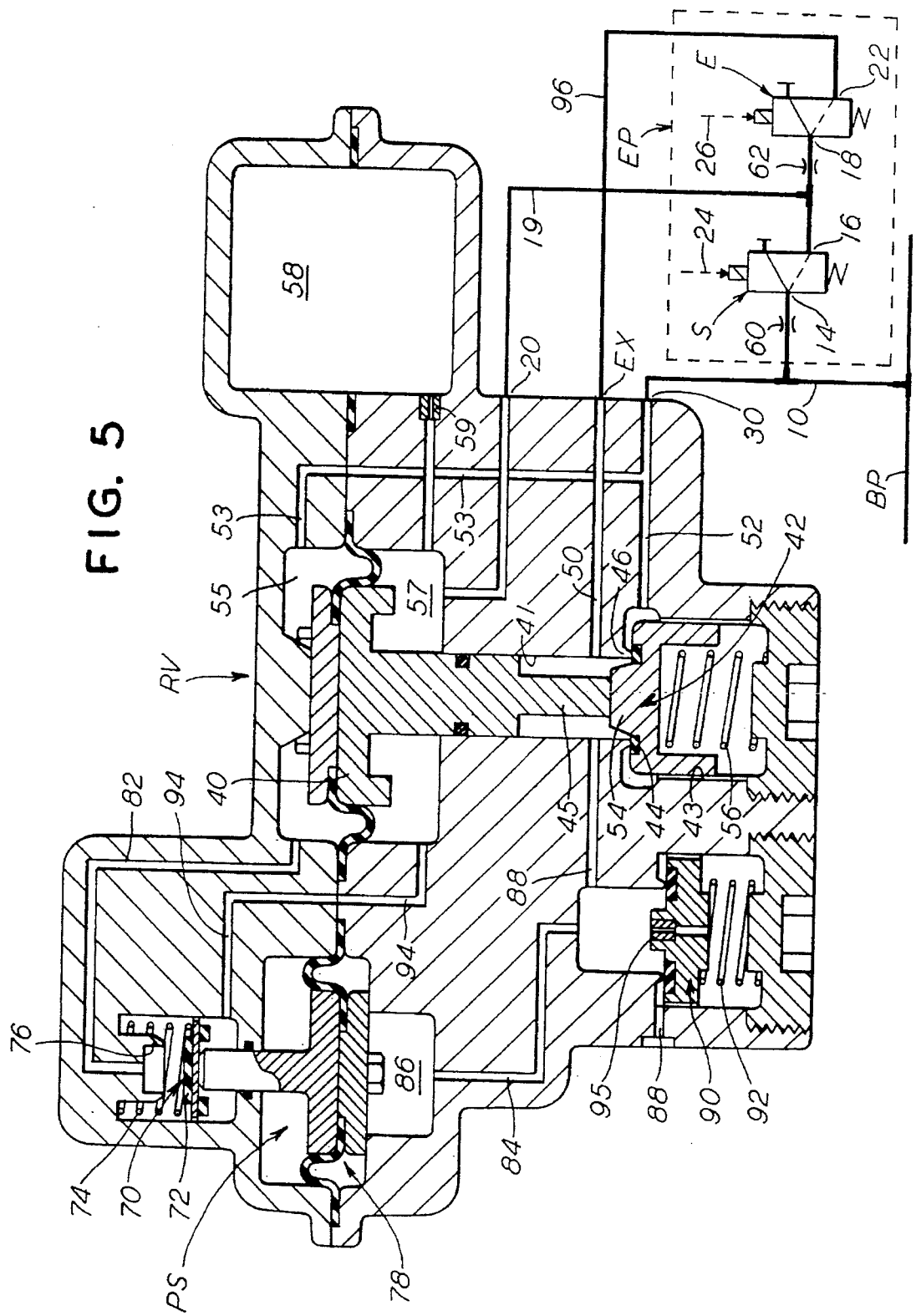
FIG. 5 is a diagrammatic view of a second embodiment of the brake pipe pressure regulating valve employed in the indirect brake cylinder pressure control system of FIG. 2 employing a pneumatic charging value to achieve fail-safe electro-pneumatic operation.

In order to overcome this potential problem, an alternate regulating valve device RV is provided, which, as shown in the embodiment of FIG. 5, employs a pneumatically operated charging or supply valve PS in parallel with solenoid supply valve S, and a backflow check valve 90. This alternate regulating valve device RV is otherwise the same as the regulating valve device of FIG. 3.

The pneumatically operated charging valve PS comprises a supply valve 70 in which a check valve 72 is biased by a spring 74 in a direction away from an annular valve seat 76 and a diaphragm operated piston 78 having an actuating stem 80 arranged to move check valve 72 in a direction toward engagement with seat 76. A passage 82 is connected between chamber 55 and the inner area of valve seat 76, and another passage 94 is connected between chamber 57 and the area outside the periphery of valve seat 76. An exhaust passage 84 is connected between bore 41 and an actuating chamber 86 formed on one side of piston 78. This actuating chamber 86 is connected to atmosphere via a branch 88 of exhaust passage 84. Backflow check valve 90 is seated by a relatively light bias spring 92 to close exhaust passage 88 when the exhaust pressure in chamber 86 falls below approximately 4–5 psi. A bleed choke 95 is associated with check valve 90 to dissipate the final pressure trapped in actuating chamber 86 when check valve 90 is closed. Outlet 22 of exhaust solenoid valve E is connected by a back pressure pipe 96 to exhaust port EX of exhaust passage 50.

During "release and charging", brake pipe pressure is connected to chamber 55 via branch pipe 10 and passage 53, and concurrently charges chamber 57 via the open supply check valve 70 independently of solenoid supply valve S. This allows the supply valve S to be normally closed. Both of the solenoid supply and exhaust valves are de-energized by microprocessor MPU during this charging period to conserve power, as shown in the following solenoid valve operating schedule.

| FUNCTION | VALVE E | VALVE S |
|---|---|---|
| release and charging | D - closed | D - closed |
| service | E - open | E - open |
| stabilization | D - closed | D - closed |
| emergency | E - open | D - closed |

As previously explained, exhaust valve 42 is also closed under the influence of spring 42, by reason of piston member 40 being pressure balanced. Choke 59 conducts air from control chamber 57 to stability chamber 58.

When a service brake application is called for, microprocessor CPU responds to the commanded brake pipe target signal transmitted from the locomotive L to energize solenoid operated supply valve S and exhaust valve E, each of which assumes its open position, as indicated in the solenoid valve operating schedule. As previously explained, the control pressure in chambers 57 and 58 is released at a predetermined rate in accordance with the initial phase of operation of regulating valve device RV. In the present embodiment, the exhaust pressure at outlet 22 of exhaust solenoid valve E is connected to actuating chamber 86 via back pressure pipe 96, exhaust port EX, exhaust passage 50 and exhaust passage 84. This pressure builds up in chamber 86 to the opening pressure of check valve 90, which is sufficient to actuate piston 78 and thereby effect closure of supply valve 70 by engagement of valve element 72 with seat 76. This assures that a pressure reduction occurs in control chamber 57 in response to operation of solenoid valves S and E to initiate the aforementioned initial phase of relay valve operation, during which piston member 40 is actuated to open exhaust valve 42 and accordingly vent brake pipe BP until the brake pipe pressure is reduced to a value corresponding to the commanded target pressure.

When the control pressure effective in chamber 57 and monitored by transducer T corresponds to the commanded target pressure, both of the solenoid valves E and S are de-energized by microprocessor CPU. Being closed in their de-energized state, in accordance with this second embodiment of the invention, as shown in the solenoid valve operating schedule, the solenoid valves trap the control pressure effective in chamber 57 as a reference value, against which further brake pipe pressure adjustments are made as the brake pipe pressure gradient settles out. It will now be appreciated that in the event a malfunction should render either one or both of the solenoid valves de-energized during this stabilizing phase of the brake pipe pressure reduction, the position of the solenoid valve(s) and thus the control pressure trapped in chamber 57 will remain unchanged and thus have no adverse affect on the brake pipe pressure reduction. That is, the charging valve will not re-open prematurely because it will be held closed by the pressure in chamber 86 until the mid-train brake pipe pressure is reduced to the natural gradient.

Figure 6:
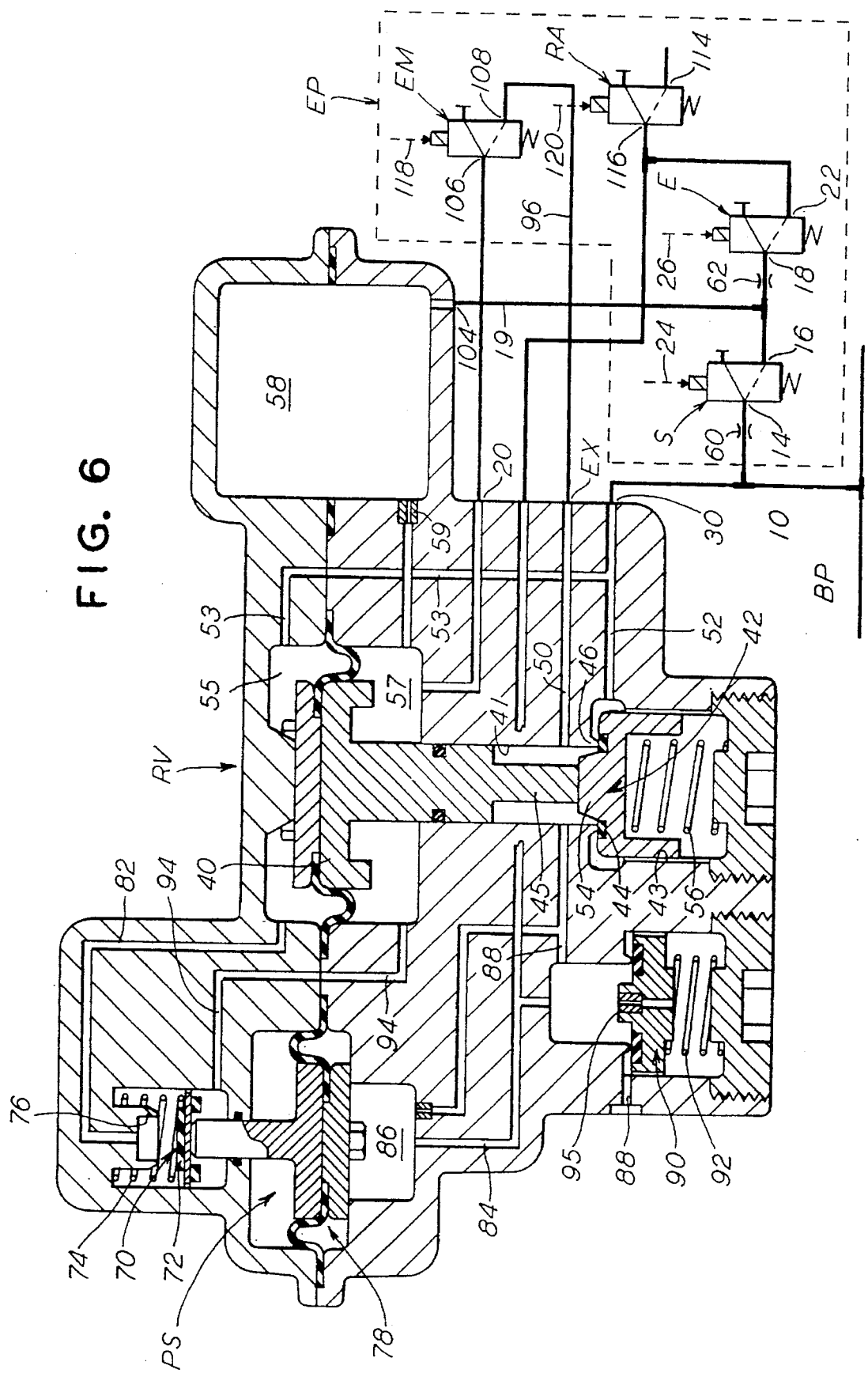
FIG. 6 is a diagrammatic view of a third embodiment of the invention similar to the FIG. 5 embodiment in which an additional emergency and release assuring solenoid valve are employed to control the regulating valve device employed in the indirect brake cylinder pressure control system of FIG. 2.

Another embodiment of the invention is shown in FIG. 6, in which the electro-pneumatic interface unit EP comprises, in addition to supply and exhaust solenoid valves S and E, a solenoid-operated, spring-returned, normally closed emergency valve EM and release assuring valve RA.

Regulating valve device RV in this embodiment is similar to the version shown in the embodiment of FIG. 5, being modified to the extent necessary to interface with the respective solenoid valves EM, RA, as follows. Exhaust passage 84 is fitted with a choke 98 at a location intermediate actuating chamber 86 and branch passage 88; an alternate exhaust passage 100 having a port 102 is connected to actuating chamber 86; and stability chamber 58 is provided with a port 104. Piping network 19 associated with the supply and exhaust solenoid valves S and E is connected to port 104 instead of control port 20, as in the previous embodiments. Control port 20 is connected to an inlet 106 of emergency solenoid valve EM, which has an outlet 108 connected to exhaust port EX via a pipe 96. Outlet 22 of solenoid exhaust valve E is connected by a pipe 112 to port 102 of alternate exhaust passage 100 instead of pipe 96, as in the embodiment of FIG. 5. Release assuring valve RA has an output 114 that is vented to atmosphere and an inlet 116 that is connected to pipe 112. The respective emergency and release assuring solenoid valves are connected to microprocessor MPU via wires 118 and 120.

In providing a separate emergency solenoid valve EM, the capacity requirement of supply and exhaust solenoid valves S and E is considerably reduced, which permits smaller valves to be employed to achieve finer increments of brake pipe pressure reductions for more accurate brake control. The availability of space within existing end-of-train units severely limits the size of volume 58 and makes the use of smaller sized solenoid valves an important requirement. Employing a combination of chokes 60, 62 associated with supply and exhaust valves S and E makes it possible to achieve the desired control of pressure in such a small volume as stability chamber 58 using standard sized choke fittings. Only if the capacity of volume 58 were substantially greater, absent the space restriction imposed by existing end-of-train units, for example, would it be practical to eliminate supply valve S and its choke 60, with exhaust solenoid valve E controlling the service reduction of control pressure in chamber 58 via choke 62 and emergency solenoid EM controlling the emergency reduction of pressure in chamber 58 via choke 110.

Given the limited capacity of volume 58, the operation of regulating valve device RV in the embodiment of FIG. 5 will be explained employing both the supply and exhaust solenoid valves S and E, in conjunction with emergency solenoid valve EM and release assuring solenoid valve RA. The solenoid valves are all de-energized during "release and charging", and are thus in a closed state, as shown in the following solenoid valve operating schedule.

| FUNCTION | VALVE E | VALVE S | VALVE RA | VALVE EM |
| --- | --- | --- | --- | --- |
| rel. and charging | D-closed | D-closed | E-open | D-closed |
| service | E-open | E-open | D-closed | D-closed |
| stabilization | D-closed | D-closed | D-closed | D-closed |
| emergency | E-open | D-closed | D-closed | E-open |

During the charging of brake pipe BP, air is connected to the underside of exhaust valve 42 via branch pipe 10, supply port 30 and passage 52, and concurrently to chamber 55 via branch passage 53. From chamber 55, air is conducted to control chamber 57 on the opposite side of piston member 40 via passage 82, open charging valve 70 and passage 94. Stability chamber 58 is charged from chamber 57 via choke 59. Under this pressure balanced condition of piston member 40, exhaust valve 42 is held closed by spring 56.

When a service brake application is called for, microprocessor MPU energizes solenoid supply valve S and solenoid exhaust valve E. Due to the relative sizes of chokes 60, 62 a predetermined rate of reduction of pressure in stability volume 58 takes place, the air being vented via piping network 19, solenoid exhaust valve outlet 22, pipe 112, auxiliary exhaust passage 100, actuating chamber 86, choke 98, passage 84, backflow check valve 90 and exhaust passage 88. Being normally seated, however, backflow check valve 90 interrupts such venting until approximately 3–4 psi pressure develops in chamber 86, thereby effecting closure of charging valve 70. The pressure effective in control chamber 57 is also vented via choke 59, which is sized relative to choke 62 so as to vent at the same predetermined rate as the stability chamber pressure. With closure of charging valve 70, pressure in chamber 55 is thus maintained at brake pipe pressure, while the pressure in control chamber 57 is being reduced, thereby establishing a pressure differential therebetween in response to which piston member 40 is actuated to in turn unseat exhaust valve element 44 from seat 46. This establishes the initial phase of relay valve operation during which brake pipe pressure is exhausted via open exhaust valve 42 at a rate corresponding to the predetermined rate of the control pressure reduction.

When the pressure in control chamber 57 is reduced to the target pressure, as determined by microprocessor MPU, in accordance with the command signal transmitted from the locomotive and the control pressure feedback signal from transducer T, the solenoid supply and exhaust valves are de-energized to trap the control pressure effective in chamber 57 and stability chamber 58. This terminates the initial phase of control and initiates a stabilization phase during which increasing brake pipe pressure at the end-of-train unit EOT, due to equalization of the brake pipe gradient, gradually establishes a pressure differential across piston member 40 sufficient to open exhaust valve 42 and accordingly exhaust brake pipe pressure to the fixed target value established by the control pressure effective in control chamber 57, until the higher mid-train brake pipe pressure is reduced and brake pipe pressure at the rear of the train stabilizes at the commanded target pressure.

A further reduction of brake pipe pressure at the end-of-train unit EOT may be made at any time during either the regulating phase or stabilizing phase of regulating valve operation, by commanding a reduced target pressure, in which case the above explained cycle of operation is repeated.

In the event a brake release is desired, the supply and exhaust solenoid valves are de-energized and the regulating valve device RV is controlled accordingly to accommodate a pressure increase under control of the locomotive via brake pipe BP, as explained relative to "release and charging".

If a brake release is desired during the stabilization phase of relay valve operation, i.e., prior to the brake pipe pressure gradient settling out, microprocessor MPU operates to momentarily (approx. 5–10 sec.) energize release assuring valve RA, the other solenoid valves being de-energized, as noted in the solenoid valve operating schedule. In its energized state, release assuring valve RA is open, connecting the holding pressure in chamber 86 to atmosphere via alternate exhaust passage 100, port 102, and pipe 112. Spring 76 is thus effective to disengage valve element 72 from seat 76 and thereby open charging valve 70 to allow the opposing pressures in chambers 55 and 57 to equalize. This, in turn, allows spring 56 to close exhaust valve 42 so that no exhaust of brake pipe pressure can occur during such re-charge of brake pipe pressure. In this manner an increase in brake pipe pressure and thus a brake release is assured. Without providing for such equalization of pressure between chambers 55 and 57, the increasing brake pipe pressure effective in chamber 55 in response to the desired brake release would re-enforce the existing pressure differential across piston member 40 and possibly cause the exhaust valve 42 to be held open. The resultant exhaust of brake pipe pressure at the end-of-train unit EOT would accordingly counteract the brake pipe increase at the locomotive and could prevent a complete brake release from occurring, particularly on the cars situated near the rear of the train.

Figure 7:
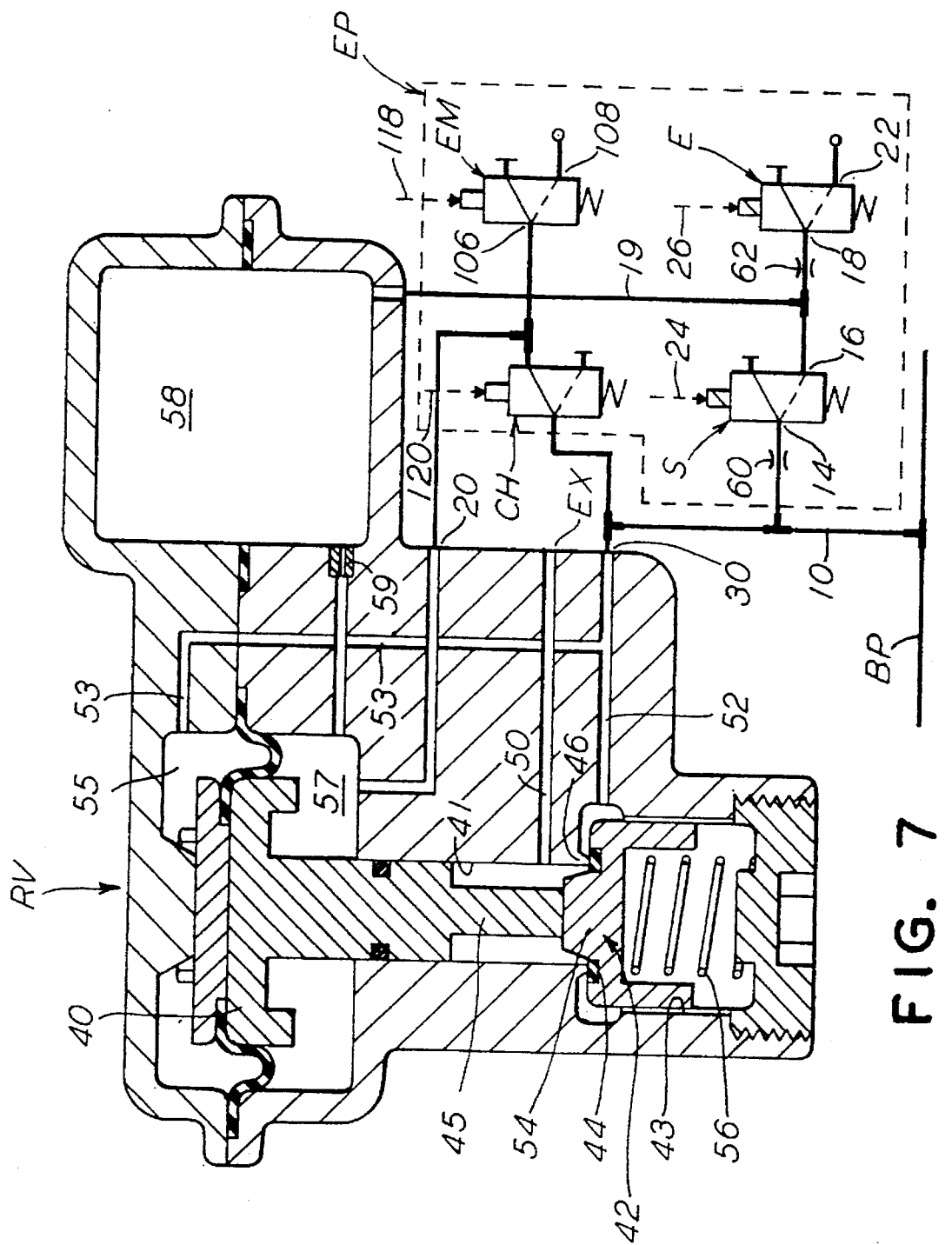
FIG. 7 is a diagrammatic view of a fourth embodiment of the invention that differs from the FIG. 6 embodiment in that a charging solenoid valve is employed in place of the pneumatic charging valve.

Another embodiment of the invention is shown in FIG. 7, which differs from the FIG. 4 embodiment in that electropneumatic interface unit EP comprises, in addition to supply and exhaust solenoid valves S and E, a solenoid-operated, spring-returned, normally closed emergency valve EM, and a solenoid-operated, spring-returned, normally open charging valve CH. As explained relative to the embodiment of the invention of FIG. 6, it is desirable from the standpoint of space limitations to keep stability chamber 58 as small as possible, thus giving rise to a separate emergency solenoid valve EM, in order to permit relatively low capacity supply and exhaust solenoid valves S and E to be employed consistent with the low volumetric capacity of chamber 58. By utilizing a solenoid operated charging valve, this FIG. 7 embodiment differs from the FIG. 6 version in that it permits elimination of the pneumatic charging valve PS, yet still avoids the problem discussed in the FIG. 4 version relative to a loss-of-power malfunction that de-energizes the supply solenoid valve S during the stabilization phase of relay valve operation.

As shown in the following solenoid valve operating schedule, all of the solenoid valves are de-energized during "release and charging" in order to conserve power.

| FUNCTION | VALVE E | VALVE S | VALVE CH | VALVE EM |
| --- | --- | --- | --- | --- |
| rel. and charging | D-closed | D-closed | D-open | D-closed |
| service | E-open | E-open | E-closed | D-closed |
| stabilization | D-closed | D-closed | E-closed | D-closed |
| emergency | D-closed | D-closed | E-closed | E-open |

During the charging of brake pipe BP, air is connected to the underside of exhaust valve 42 via branch pipe 10, supply port 30 and passage 52, and to chamber 55 on the upper side of piston member 40 via passage 53. Also from branch pipe 10, brake pipe air is connected to control chamber 57 at the underside of piston member 40 via open solenoid charging valve CH and a pipe 120 that is connected to control port 20. Stability chamber 58 is charged from control chamber 57 via choke 59.

When a service brake application is called for, microprocessor MPU energizes supply, exhaust and charging valves S, E and CH. As previously explained, the resultant supply and exhaust of air at the respective supply and exhaust valves is regulated by chokes 60 and 62 so that the resultant pressure in piping network 19 is reduced at a predetermined rate. Such an arrangement makes it feasible to obtain a service rate of reduction in stability chamber 58 and control chamber 57, while limiting the volumetric capacity thereof in accordance with the space available within existing end-of-train units EOT. Concurrently, charging valve CH is closed to terminate charging of control chamber 57 during such service reduction of control chamber pressure, as explained.

The resultant pressure differential developed across piston member 40 deflects the piston member to open exhaust valve 42 and thereby vent brake pipe BP via branch pipe 10, passage 52, open exhaust valve 42, passage 52 and exhaust port EX. The brake pipe pressure is thus reduced at the last car $C_{NL}$ in conjunction with a reduction at the locomotive. Control spring 56 in conjunction with the variable orifice area of exhaust valve 42 regulates the rate of brake pipe pressure reduction so as to not exceed the predetermined rate established at control chamber 57 during this initial phase of relay valve operation.

When the target brake pipe control pressure called for has been attained, solenoid exhaust valve E is switched by microprocessor MPU to its de-energized, normally-closed state to terminate the control pressure reduction in chamber 57. This terminates the initial phase and initiates a stabilizing phase of relay valve operation, during which the other solenoid valves S, CH and EM are de-energized and the brake pipe pressure gradient flow is exhausted gradually by the self-regulating action of regulating valve RA until the gradient is stabilized.

A further reduction of brake pipe pressure at the end-of-train unit EOT may be made at any time during either the initial phase or stabilizing phase of regulating valve operation, by commanding a reduced target pressure in which case the above-explained cycle of operation is repeated.

In both of the embodiments of FIGS. 6 and 7, an emergency rate of reduction of brake pipe pressure is achieved at the end-of-train unit EOT when microprocessor MPU energizes emergency solenoid valve EM, as indicated in the respective solenoid valve operating schedules, in accordance with transmission of an emergency command from the locomotive. In its energized condition emergency solenoid valve EM is open. In the FIG. 6 embodiment, control chamber pressure is thus exhausted via regulating valve control port 20, emergency valve inlet 106 and outlet 108, pipe 96, regulating valve exhaust port EX, exhaust passages 50 and 84 and branch passage 88. In the FIG. 7 version, control chamber pressure is exhausted directly at emergency valve outlet 108. In either case, the exhaust of control pressure in chamber 57 is substantially unrestricted, thus creating a pressure differential across piston member 40 sufficient to deflect exhaust valve 42 enough to displace tapered protrusion 54 from bore 48. Brake pipe pressure is thus exhausted substantially unrestricted past exhaust valve seat 46. In the FIG. 6 embodiment, the exhausting brake pipe pressure is vented to atmosphere via exhaust passage 84, backflow check valve 90 and branch passage 88. In the FIG. 7 version, brake pipe pressure is vented directly to atmosphere via exhaust passage 50 and exhaust port EX.

It will be understood that in providing a separate emergency valve EM in the embodiment of FIGS. 6 and 7, smaller capacity supply and exhaust valves S, E may be employed. Moreover, separate charging valve CH makes supply valve S expendable when space limitation permits the volume of stability chamber 58 to be such that the exhaust valve choke 62 can produce a service rate of reduction of pressure in control chamber 57. Where this volume is restricted to less than approximately 6.0 cu. in., however, the exhaust of pressure via choke 62 must be counteracted to some degree by supplying brake pipe pressure to chamber 57 via choke 60, in order to limit the rate of reduction of control pressure in chamber 57 to a service rate.

Separate charging valve CH in the FIG. 7 embodiment further eliminates the need for a pneumatic charging or supply valve PS, as employed in the FIGS. 5 and 6 embodiments, irrespective of the size of stability chamber 58.

I claim:

1. A regulating valve device for reducing the fluid pressure in a railroad train brake pipe at a location remote from the train locomotive comprising:

a) an exhaust passage open to atmosphere;

b) a supply passage to which said brake pipe is connected;

c) a control passage;

d) a bore having said exhaust passage and said supply passage opening thereinto;

e) an annular valve seat in said bore between said exhaust passage and said supply passage;

f) an exhaust valve member having a protrusion cooperatively arranged with said bore to provide a variable flow orifice therebetween;

g) a valve seal element on said exhaust valve member adjacent said valve seat;

h) a spring acting on said exhaust valve member in a direction to effect engagement of said valve seal element with said valve seat;

i) a control piston having a first chamber on one side thereof to which said control passage is connected and a second chamber on the opposite side thereof to which said supply passage is connected;

j) an actuating stem between said control piston and said exhaust valve member, said control piston being operative in response to a pressure differential between said first and second chambers to effect disengagement of said valve seal element from said valve seat via said actuating stem without displacing said protrusion from said bore provided said pressure differential occurs as a result of a fluid pressure change in either one of said first and second chambers relative to the other of said first and second chambers at a service rate that is less than a predetermined emergency rate.

2. A regulating valve device as recited in claim 1, wherein said protrusion of said exhaust valve member has a rectilinear taper.

3. A regulating valve device as recited in claim 1, wherein said protrusion of said exhaust valve member is conical in shape.

4. A regulating valve device as recited in claim 1, wherein said protrusion of said exhaust valve member is displaced from said bore when said pressure differential occurs as a result of said fluid pressure change in either one of said first and second chambers relative to the other of said first and second chambers exceeding said service rate.

5. A regulative valve device as recited in claim 1, further comprising:

a) a stability chamber; and b) a connecting passage between said stability chamber and said first chamber.

6. A regulating valve device as recited in claim 1, further comprising charging valve means for controlling fluid pressure communication between said first and second chambers.

7. A regulating valve device as recited in claim 6, wherein said charging valve means comprises:

a) a normally open supply valve via which fluid pressure is conducted from said second chamber to said first chamber;

b) an actuating piston operably engaged with said supply valve;

c) an actuating chamber formed on one side of said actuating piston, said actuating chamber being connected to said exhaust passage; and d) check valve means in said exhaust passage for establishing a pre-determined back pressure in said actuating chamber when said valve seal on said exhaust valve member is disengaged from said valve seat to thereby effect closure of said normally open supply valve.

8. A regulating valve device as recited in claim 7, further comprising choke means in parallel with said check valve means for dissipating fluid pressure in said actuating chamber when said valve seal element of said exhaust valve member is engaged with said valve seat.

9. For a railroad train having a brake pipe extending continuously from the locomotive to a remote location in said train, a brake pipe pressure control system comprising:

a) means at said remote location for receiving a brake pipe pressure command signal;

b) a regulating valve device to which said brake pipe is connected at said remote location;

c) transducer means for providing a feedback signal corresponding to the brake pipe pressure effective at said regulating valve device;

d) electro-pneumatic means for controlling fluid pressure communication between said brake pipe and said regulating valve device and between said regulating valve device and atmosphere; and e) control means for operating said electro-pneumatic means to establish said fluid pressure communication between said regulating valve device and atmosphere in response to said command signal being less than said feedback signal, said regulating valve device comprising:

(i) an exhaust passage open to atmosphere;

(ii) a supply passage to which said brake pipe is connected;

(iii) a first control passage to which said brake pipe is connected;

(iv) a bore having said exhaust passage and said supply passage opening thereinto;

(v) an annular valve seat in said bore between said exhaust passage and said supply passage;

(vi) an exhaust valve member having a valve seal element adjacent said valve seat;

(vii) a spring acting on said exhaust valve member in a direction to effect engagement of said valve element with said valve seat;

(viii) a control piston having first and second chambers formed on opposite sides thereof to which said first control passage is connected and a second chamber formed on the opposite side thereof to which said supply passage is connected; and (ix) an actuating stem between said control piston and said exhaust valve member, said control piston being operative in response to a pressure differential between said first and second chambers to effect disengagement of said valve element from said valve seat via said actuating stem against the force of said spring when said pressure differential occurs as a result of a fluid pressure change in either one of said first and second chambers relative to the other of said first and second chambers.

10. A brake pipe pressure control system as recited in claim 9, further comprising:

a) a protrusion on said exhaust valve member disposed within said bore and cooperatively arranged therewith to provide a variable flow orifice therebetween; and b) said valve seal element being disengageable from said valve seat without displacing said protrusion from said bore, whereby said fluid pressure change in either one of said first and second chambers relative to the other of said first and second chambers is limited to a service rate that is less than a predetermined emergency rate.

11. A brake pipe pressure control system as recited in claim 10, said regulating valve device being further characterized in that said pressure change occurs due to a reduction of fluid pressure in said first chamber relative to said second chamber during an initial phase of operation in response to said command signal being received at said remote location.

12. A brake pipe pressure control system as recited in claim 11, said regulating valve device being further characterized in that said pressure change occurs due to an increase of fluid pressure in said second chamber relative to said first chamber during a stabilization phase of operation in accordance with said brake pipe pressure at said supply passage increasing following termination of said initial phase of operation.

13. A brake pipe pressure control system as recited in claim 10, said regulating valve device being further characterized in that said protrusion has a rectilinear taper.

14. A brake pipe pressure control system as recited in claim 10, said regulating valve device being further characterized in that said protrusion is conical in shape.

15. A brake pipe pressure control system as recited in claim 11, wherein said electro-pneumatic means comprises:
 a) a solenoid-operated supply valve having an inlet connected to said brake pipe and an outlet connected to said first control passage;
 b) a solenoid-operated exhaust valve having an inlet connected to the outlet of said supply valve and an outlet connected to atmosphere; and
 c) first and second chokes respectively at the inlets of said supply and exhaust valves, the flow capacity of said first choke and second choke being such as to provide said reduction of fluid pressure in said first chamber at said service rate in accordance with fluid pressure communication being established between the inlet and outlet of each said supply and exhaust valve.

16. A brake pipe pressure control system as recited in claim 11, wherein said regulating valve device is further characterized in that the flow capacity of said second choke provides said reduction of fluid pressure in said first chamber at said predetermined emergency rate in accordance with fluid pressure communication between the inlet and outlet of said supply valve being interrupted.

17. A brake pipe pressure control system as recited in claim 11, said regulating valve device further comprising charging valve means for providing fluid pressure communication between said first and second chambers.

18. A brake pipe pressure control system as recited in claim 17, wherein said charging valve means comprises:
 a) a supply valve member;
 b) a spring acting on said supply valve member in an opening direction;
 c) a fluid pressure operated piston member acting on said supply valve member in a closure direction opposite said opening direction; and
 d) an actuating chamber in which said piston member is operatively disposed, said exhaust passage opening into said actuating chamber.

19. A brake pipe pressure control system as recited in claim 18, further characterized in that the outlet of said solenoid-operated exhaust valve is connected to said exhaust passage.

20. A brake pipe pressure control system as recited in claim 19, wherein said regulating valve device further comprises:
 a) backflow check valve means in said first exhaust passage; and
 b) a branch passage connected between said actuating chamber and said exhaust passage upstream of said backflow check valve means.

21. A brake pipe pressure control system as recited in claim 20, wherein said regulating valve device further comprises a third choke in parallel with said backflow check valve means.

22. A brake pipe pressure control system as recited in claim 20, wherein said regulating valve device further comprises an actuating passage connected to said actuating chamber in parallel with said branch passage.

23. A brake pipe pressure control system as recited in claim 22, wherein said electro-pneumatic means further comprises a solenoid-operated release assuring valve having an inlet connected to said actuating passage and an outlet connected to atmosphere.

24. A brake pipe pressure control system as recited in claim 23, wherein said electro-pneumatic means further comprises said solenoid-operated exhaust valve having the outlet thereof connected to said actuating passage.

25. A brake pipe pressure control system as recited in claim 24, wherein said regulating valve device further comprises:
 a) a stability chamber;
 b) a connecting passage between said first chamber and said stability chamber; and
 c) a second control passage connected to said stability chamber.

26. A brake pipe pressure control system as recited in claim 25, wherein said electro-pneumatic means further comprises a solenoid operated emergency valve having an inlet connected to said first control passage and an outlet connected to said exhaust passage.

27. A brake pipe pressure control system as recited in claim 26, wherein said regulating valve device further comprises a fourth choke in said connecting passage, said stability chamber having a volume of approximately 65 cu. in.

28. A brake pipe pressure control system as recited in claim 11, wherein:
 a) said regulating valve device further comprises:
  (i) a stability chamber;
  (ii) a second control passage connected to said stability chamber;
  (iii) a connecting passage between said first chamber and said stability chamber; and
 b) said electro-pneumatic means further comprises:
  (i) a solenoid-operated supply valve having an inlet connected to said brake pipe and an outlet connected to said second control passage; and
  (ii) a solenoid operated exhaust valve having an inlet connected to the outlet of said supply valve and an outlet connected to atmosphere; and
  (iii) a solenoid operated charging valve having an inlet connected to said brake pipe and an outlet connected to said first control passage.

29. A brake pipe pressure control system as recited in claim 28, further comprising:
 a) said electro-pneumatic means further including a solenoid-operated emergency valve having an inlet connected to said first control passage and an outlet connected to atmosphere; and
 b) said regulating valve device further including a third choke in said connecting passage.

* * * * *